Figure 1:
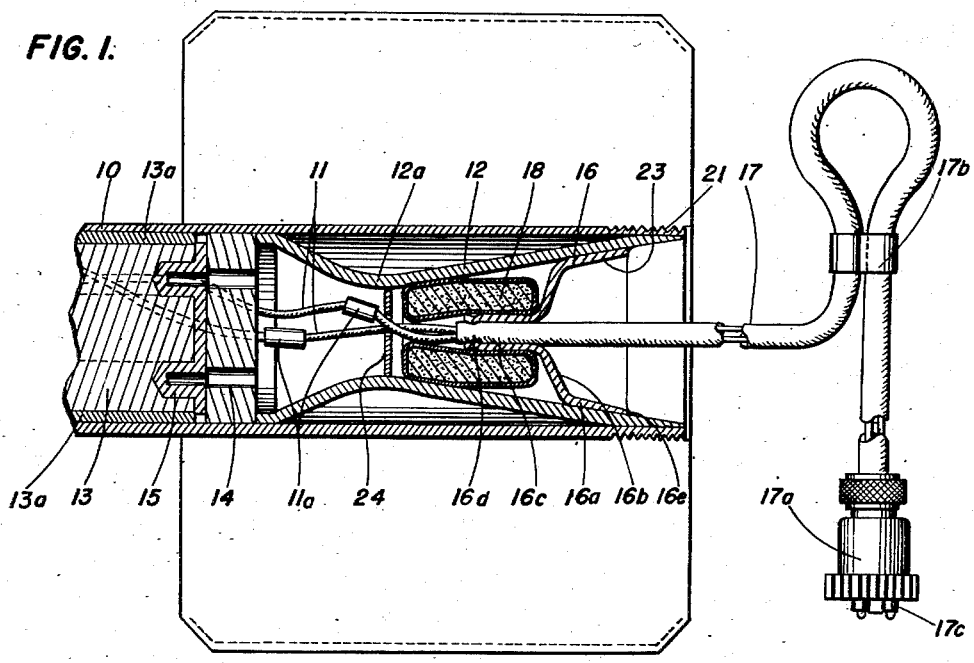

May 28, 1957 B. H. SAGE ET AL 2,793,492
ROCKET ASSEMBLY
Filed Nov. 24, 1944

INVENTORS
BRUCE H. SAGE
KENNETH H. ROBINSON
BY
ATTORNEY

United States Patent Office 2,793,492
Patented May 28, 1957

2,793,492
ROCKET ASSEMBLY

Bruce H. Sage, Altadena, and Kenneth H. Robinson, Pasadena, Calif., assignors to the United States of America as represented by the Secretary of the Navy Application November 24, 1944, Serial No. 564,994

4 Claims. (Cl. 60—35.6)

This invention relates to rocket assemblies and has particular relation to a novel sealing means for the nozzle of a rocket motor.

An object of the present invention is to provide a rocket nozzle sealing means which closes the nozzle end of a rocket motor against the entrance of moisture or other deleterious matter and which provides a compartment for containing the ignition cable during shipment.

Another object of the present invention is to provide a rocket nozzle sealing means which is designed to withstand the rough treatment incidental to transportation and handling of the rocket motor.

A further object of the invention is to provide a rocket nozzle sealing means which includes a partition or sealing element fitting within the nozzle and so constructed that it remains in place without the provision of grooves or other modifications in the nozzle contour which might reduce the nozzle efficiency or increase dispersion of the rocket flight, the sealing element being readily discharged from the nozzle immediately upon development of a predetermined pressure within the rocket motor so that the sealing element does not harmfully obstruct passage of the exhaust gases through the rocket nozzle.

A still further object is to provide a rocket nozzle sealing means which is adapted to close the nozzle of a rocket motor, provide a compartment for storing the ignition cable during shipment, thereby preventing the cable from being damaged or disconnected, and provide a desiccant for absorbing moisture which may be present in the rocket motor.

The ignition of propellants in rocket motors is generally accomplished by an igniter inserted adjacent the propellant grains in the motor tube. The igniter includes an electrically operated squib, and electric leads therefrom extend rearwardly and outwardly through the rocket motor nozzle to a suitable source of electricity and a firing circuit. The lead wires may be provided with a terminal plug adapted to fit into a socket at the source of electricity, the lead wires being of sufficient length to reach from the rocket to the source of electricity. Heretofore, the extending lead wires as such, united in the form of an ignition cable with the terminal plug attached, have resulted in defective and inoperative rockets for the reason that the exterior segment of the ignition cable or the terminal plug has been damaged or disconnected from the rocket motor during shipping and handling of the rocket assembly. Defective rockets have also resulted from the entrance of moisture and other foreign matter through the nozzle due to the absence of nozzle sealing means or the use of conventional nozzle plugs.

Figure 2:
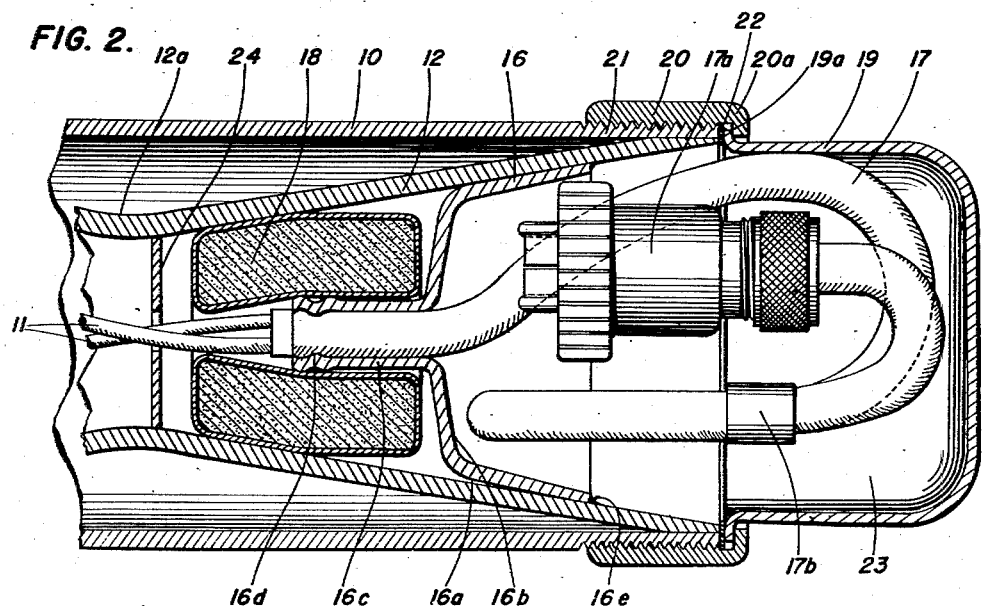

These and other objects of the invention will be better understood by reference to the accompanying drawing, in which Fig. 1 is a longitudinal sectional view of the nozzle end of a rocket motor incorporating a preferred form of rocket nozzle sealing means embodying the present invention, and Fig. 2 is an enlarged, fragmentary, longitudinal sectional view of the nozzle end illustrated in Fig. 1, showing the ignition cable stored in a compartment formed by the rocket nozzle sealing means.

Referring to the drawing, the rocket motor includes a motor tube 10 having within the forward end thereof an igniter and squib (not shown) having lead wires 11 extending rearwardly through the motor tube and into the nozzle 12.

A cylindrical propellant grain 13, having supporting inhibitor strips 13a, is mounted in the motor tube. The rear end of the motor tube contains the nozzle 12, and a suitable support 14 is provided within the rocket motor adjacent to the nozzle for the purpose of supporting a plate 15 which supports and positions the propellant grain 13.

The rocket nozzle has a venturi section forming a throat 12a from which the walls of the nozzle diverge both forwardly and rearwardly. The rearwardly diverging portion of the nozzle receives a sealing element 16, preferably constructed of a molded plastic, such as cellulose acetate or other suitable flexible material. The sealing element includes a frusto-conical body portion 16a, the wall of which normally diverges at a slightly greater angle than the adjacent wall of the nozzle, so that the sealing element may be wedged tightly into the nozzle. The wall of the frusto-conical body portion 16a preferably tapers in thickness from the forward, smaller diametered part to the rearward, larger diametered end. A suitable sealing compound, such as "Sillers" amphibious enamel or "Glyptal" resin, is spread on the outer surface of the frusto-conical body portion before insertion into the nozzle. An additional sealing compound may be applied to the rear, exposed end 16e of the sealing element in order to reduce the amount of moisture-vapor transmission into the motor tube.

The frusto-conical portion of sealing element 16 converges, as shown at 16b, into a forwardly directed tubular neck or stem 16c adapted to receive an ignition cable 17. The cable is joined to the lead wires by contact connectors 11a, such as "Stakon" connectors, so that it may be readily severed from the motor tube when the rocket is fired. The cable is of sufficient length to extend out of the nozzle 12 and make contact with a source of electric current (not shown) by means of a terminal plug 17a. A clamp 17b may be conveniently used to loop the cable, thereby confining its length while it is not in use. A suitable sealing compound, such as "Glyptal" resin, is placed between the cable and the stem and the stem is cemented and heat crimped, as shown at 16d, so that the cable is tightly held thereby. A doughnut-shaped desiccant bag 18 is preferably mounted in the nozzle and receives the stem 16c of the sealing element 16. While the principal purpose of the desiccant bag is for absorbing any moisture that may be present in the motor tube, it also serves to position the sealing element 16 within the nozzle.

At the rear end of the rocket motor tube is a cup-shaped cap 19 preferably drawn from sheet metal. The cap 19 is provided with a small external flange 19a which abuts the rear end of the motor tube and is held thereon by means of an internally threaded coupling 20 which screws onto a threaded end-portion 21 of the motor tube. The coupling is provided with an internal flange 20a adapted to engage the flange 19a. A suitable gasket 22 is interposed between the rear end of the nozzle and motor tube and the flange 19a in order to exclude moisture, vapor and other foreign matter.

The sealing element 16 and the cap 19 define a compartment 23 which is adapted to receive the ignition cable 17 and the plug 17a. A circular disk 24, which is provided with a center hole, may be mounted at the throat 12a of the nozzle to support the lead wires 11 within the nozzle.

In utilizing the present invention, the rocket motor sealing means is preferably assembled by inserting the ignition cable 17 into the desiccant bag 18 and then inserting the bag into the exhaust port of the nozzle. The inner surface of the tubular neck 16c is coated with "Glyptal" resin sealing compound, and the ignition cable 17 is inserted therein and heat crimped as shown at 16d. The outer surface of the frusto-conical body 16a is coated with "Sillers" amphibious enamel and the sealing element is then wedged into the exhaust port of the nozzle, the tubular neck 16c being inserted in the center hole of the desiccant bag. The rear edge of the sealing element 16 is sealed to the nozzle with "Glyptal" resin as shown at 16e. The terminal plug 17a is attached to the end of the ignition cable which is conveniently retained in a loop by the clamp 17b, and the ignition cable is looped into the front part of compartment 23 formed by the sealing element 16. The gasket 22 is placed on the flange 19a of the cap 19 which is secured to the rocket nozzle by means of the coupling 20. In this manner, the rocket assembly may be shipped without exposing the interior of the rocket motor to moisture or direct contact with an element which would accidently ignite the propellant directly, or by means of the ignition cable. Furthermore, the ignition cable is protected from being damaged or accidentally torn from the rocket motor.

When the rocket assembly is to be fired, the cap 19 is removed and the ignition cable 17 is withdrawn from the interior of the nozzle and plugged into the source of electricity by means of the terminal plug 17a, the shorting clip 17c first being removed. The clamp 17b forms a loop in the cable 17 which is attached to a hook, not shown, fastened to the launcher rails.

When the firing circuit is closed, the current passes through the igniter cable 17 and fires the squib which ignites the propellant 13. The exhaust gases given off by combustion of the propellant increase the pressure within the motor tube and cause the disk 24, sealing element 16, the desiccant bag 18, and the ignition cable 17 to be blown from the nozzle. When the rocket fires, the sudden violent jerk as the closure assembly is ejected is taken by the hook, over which the loop of cable is placed, instead of the electrical connection into which the plug 17a is inserted. Thus, it is apparent that the nozzle sealing means in no way impairs the efficiency or the performance of the rocket motor as by clogging the nozzle.

We claim:

1. In combination with a rocket motor having an exhaust nozzle and an ignition cable in said nozzle, a rocket nozzle sealing means comprising a flexible sealing element having a reduced neck portion and an enlarged body portion wedged into the exhaust port of the nozzle, said neck portion having an opening therethrough for passing and positioning the ignition cable in the nozzle.

2. In combination with a rocket motor having an exhaust nozzle and an ignition cable adapted to extend from within said motor through said nozzle to a point remote from said nozzle, a rocket nozzle sealing means comprising a flexible sealing element having a reduced neck portion and an enlarged body portion wedged into the exhaust port of the nozzle, said neck portion having an opening through which the ignition cable passes, and a closure member attached to said nozzle for closing the rear end thereof, said closure member and said sealing element defining a compartment containing the outer end portion of said ignition cable.

3. In combination with a rocket motor having an exhaust nozzle and an ignition cable in said nozzle, a rocket nozzle sealing means comprising a flexible, sealing element having a tubular neck portion and a frusto-conical body portion adapted to be wedged into the exhaust port of the nozzle, said neck portion having an opening through which the ignition cable passes, and a desiccant bag having a central opening receiving said neck portion.

4. In combination with a rocket motor having an exhaust nozzle and an ignition cable adapted to extend from within said motor through said nozzle to a point remote from said nozzle, a rocket nozzle sealing means comprising a flexible sealing element having a tubular neck portion and a frusto-conical body portion adapted to be wedged into the nozzle, said neck portion having an opening through which the ignition cable passes, a desiccant bag having a central opening receiving said neck portion, and a cup-shaped closure member attached to the nozzle for closing the rear end thereof, said closure member and said sealing element defining a compartment containing the outer end portion of said ignition cable.

References Cited in the file of this patent

UNITED STATES PATENTS

| | | |
|---|---|---|
| 785,644 | Unge | Mar. 21, 1905 |
| 1,360,602 | Van Deuren | Nov. 30, 1920 |